3,170,837
METHOD OF OBTAINING ANTIBIOTIC AND PRODUCT

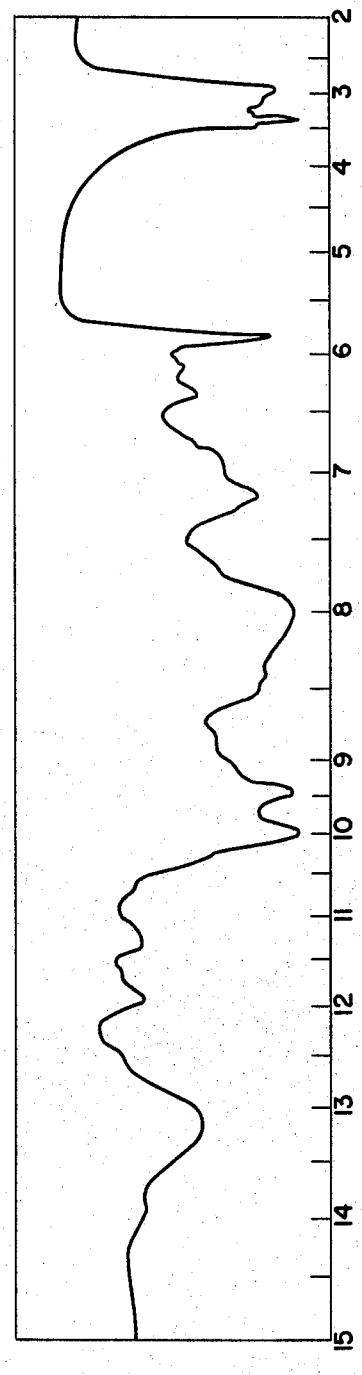

Federico Arcamone, Aurelio di Marco, Mario Ghione, Paolo Pennella, and Arpad Green, all of Milan, Italy, assignors to Società Farmaceutici Italia, a corporation of Italy
Filed Mar. 13, 1958, Ser. No. 721,319
Claims priority, application France, Mar. 15, 1957, 734,081
7 Claims. (Cl. 167—65)

This invention relates to a new antibiotic and to the method of obtaining it.

More particularly, the invention relates to the discovery that *Streptomyces lucensis*, a new strain of Streptomyces isolated by us from a soil sample taken in the Lucca region of Tuscany, Italy, produces a new antibiotic if grown in suitable culture media. This new strain of Streptomyces was deposited in the mycological collection of the Institute of Plant Pathology at the University of Milan, Milan, Italy, where it was given the code IPV 139X.

This antibiotic, which we have designated as antibiotic FI 1163 is of particular interest because of its high antifungus activity.

Various materials have become known in the past that possess antifungus properties. They are obtained either synthetically or by fermenting microorganisms. A partial list of antibiotic materials of this type includes candidin, ascosin, actinomycins, streptothrycin, geomycin; all of which are metabolic products of certain Streptomyces. It is well-known, however, that these materials also possess an undesirable toxicity for higher animals, which greatly restricts their practical use.

In contrast thereto, the antibiotic according to the present invention is specifically active against fungi and yeasts that are pathogenic for plants, animals and man and, is substantially innocuous to higher organisms.

It is, therefore, one of the objects of the present invention to provide a method of producing this new antibiotic.

It is another object of the invention to provide this new antibiotic.

It is still another object of the invention to utilize the new antibiotic in combatting diseases in plants, animals and man that are caused by pathogenic fungi and yeasts.

These and other objects and advantages of the invention will appear in more detail from the herein-following detailed description.

As stated, antibiotic FI 1163 is produced by fermentation of *Streptomyces lucensis* which has been isolated by suspending soil in plates containing a glycerol-glycocoll medium and incubating in a thermostat at 37° C. for five days.

DESCRIPTION AND CLASSIFICATION OF THE STRAIN

Under the optical microscope this strain shows branched hyphae with spiral-like branches, frequently with curled ends.

Potato-agar: very good growth, light lemon yellow vegetative mycelium, chamois-gray or powder-like light brown aerial mycelium with diffused, more lightly colored tufts or zones. Soluble pigment, ash-gray after three days, gray-brown thereafter.

Czapek-agar: very substantial growth, colorless to honey colored vegetative mycelium; powdery, white to opaque-white aerial mycelium; does not produce any soluble pigment; its back varies from colorless to a very pale lemon yellow.

Carrot-agar: good growth, colorless vegetative mycelium, powdery, chamois-gray aerial mycelium; no production of soluble pigments; back from colorless to ochre.

Starch-agar: very good growth; vegetative mycelium from colorless to honey; powdery aerial mycelium from chamois-gray to light-brown, sometimes with small white tufts; mycelium also takes a mauve shade; absence of soluble pigment; backside from colorless to very pale yellow. Starch is well hydrolyzed.

Yeast-agar: good growth, brown vegetative mycelium; scarcely grown, gray-brown, aerial mycelium; grows in small projecting colonies; soluble brown pigment.

Glycerol-glycocoll-agar: excellent growth, lemon-yellow vegetative mycelium with yellowish back; powdery, gray-brown aerial mycelium; a soluble pigment is produced.

Gelatine: abundant growth, brown vegetative mycelium, white first and then gray-brown aerial mycelium. Heavy wrinkling of the substratum already after three days. No liquefaction even after twenty-five days.

Meat broth: after twenty days very light growth in flocks or floating on the surface, heavy wrinkling of the broth.

This strain is only very little active against gram-positive bacteria, shows no activity against gram-negative bacteria and mycobacteria, but shows good activity against the yeasts, and very good activity against either pathogenic vegetable or animal fungi or saprophytes in general.

According to the aforementioned characteristics, this Streptomyces strain which we have isolated and named "*Streptomyces lucensis*" corresponds with neither of the species mentioned in the literature and, in particular, classified in Bergey's "Manual of General Microbiology."

The strain is well kept on a solid medium containing carbon hydrates (such as starch, glucose, etc.), nitrogen-containing materials such as amino-acids or more complex materials of this type as well as salts. The production of spores is thereby always very abundant. The incubation time is approximately ten days at a temperature of between 26° and 37° C., preferably at 28° C. On solid medium the strain can be preserved for a period up to three months at a temperature of approximately 0° C. It can be also preserved on a lyophilized sterile medium.

The production of the antibiotic is carried out according to the general process of growing Streptomyces of the aforementioned characteristics, in contact with a sterile liquid containing one or more sources of assimilable carbon, nitrogen and salts. Dextrose, saccharose, dextrines or other assimilable polysaccharides can be used as sources of assimilable carbon. As source of assimilable nitrogen proteinaceous materials such as casein, peptones or more simple nitrogen compounds such as aminoacids, can be used, but also vegetable extracts, meat extracts or other sources such as corn-steep liquor extract or protein hydrolysis products.

Fermentation can be carried out, for example, in a 100 to 500 cc. Erlenmeyer flask with good aeration and at an optimum temperature of 25 to 35° C. Activity becomes noticeable within thirty hours and remains high and constant up to about seventy hours.

*Streptomyces lucensis* can also be grown in the usual manner by submerged fermentation while stirring and aerating at a suitable temperature.

The antibiotic activity of these cultures is determined on a test organism which, in the present case, is a *Debaryomyces marylandii* op. 52 L.C.I. A suitable suspension of this organism is added to Sabouraud agar culture (cooled to 50° C.), whereupon the plates are incubated for forty-eight hours at 25–29° C. and the halos which form are observed.

The present invention relates also to the extraction and purification of the new antibiotic from cultures of *Streptomyces lucensis* wherein it is produced. Active and sufficiently purified preparations of the antibiotic are obtained according to this invention by extracting either the filtrate and the mycelium separately, or by extracting the unfiltered broth with solvents such as chloroform or water-immiscible or partially water-miscible alcohols; of these we prefer normal butyl alcohol and extract of the filtrate and the mycelium separately therewith.

The separate extraction of mycelium can be carried out with the afore-named as well as with other solvents wherein the antibiotic is sufficiently soluble. Examples of such solvents are anhydrous or aqueous lower alcohols and aqueous acetone. The pH of the cultures, before the filtration and extraction, is preferably adjusted to about 7, but can be, broadly, carried out at a pH ranging from 2 to 8.

The extracts obtained are then vacuum concentrated and the active material is precipitated by means of a solvent wherein it is insoluble, such as petroleum ether.

This precipitate, dried and pulverized, is a cream, light yellow, or light brown powder.

This product can be purified by taking advantage of the solubility characteristics of the antibiotic which in form of the sodium salt is soluble in a phosphate buffer solution of pH 7 or in a sodium bicarbonate solution, while it is scarcely soluble in water at a pH of between 4 and 5. Our preferred purification process is based on these solubility characteristics; we extract the crude product with a phosphate buffer solution of pH 7 or with a sodium bicarbonate solution, and centrifuge the resulting suspension in order to separate an inactive residue; the clear solutions is brought to a pH of 4, 5 by means of a mineral acid and the precipitate obtained thereby is centrifuged off and dried.

These operations are preferably carried out in a nitrogen atmosphere, in the dark and at low temperature.

A further purification of the product can be attained by well-known methods of extraction and washing with solvents in which FI 1163 is respectively soluble or insoluble.

In any case, both the product obtained as mentioned above and the product after further purification show the previously indicated characteristics.

The new antibiotic is a nitrogen containing compound of acidic character which does not contain any sulfur. It is scarcely soluble in water while its sodium salt is water soluble. It is very soluble in chloroform and ethyl-Cellosolve, soluble in methanol, ethanol, n-butanol, pyridine, dimethylformamide, scarcely soluble in acetone and ethyl acetate, insoluble in ether, gasoline and petroleum ether. When treated with concentrated sulfuric acid, a red-brown color is produced. The solution of FI 1163 in methyl alcohol gives U.V. spectra having 3 absorption peaks at 290, 304 and 318 mu.

The infrared absorption spectrum in KBr is shown in the accompanying drawing in which the ordinates indicate the percent transmission and the abscissa the wave length in microns.

In order to present a more complete characterization of the new product, the Rƒ obtained in chromatography tests on Whatman paper No. 1 are reported herein-below, with ascendant development as indicated by bioautography on plates inoculated with "*Candida albicans*."

Solvent system: Rƒ
(1) Butanol-acetic acid-water 2:1:1 _____ 0.75
(2) Benzene-acetic acid-water 2:1:1 _____ 0.21
(3) Butanol-pyridine-water 2:0.6:1 _____ 0.60
(4) Butanol saturated with water + 2% ammonium hydrate _____ 0.06

FI 1163 in the solid state is very stable, especially when stored in absence of light and air. A neutral aqueous solution thereof, stored at +5° C., retains its activity for several days; but the activity decreases rapidly if the same solution is stored at room temperature.

According to the afore-mentioned characteristics, the new antibiotic belongs to the group of polyene antibiotics with a tetraene chromophor. The first two representatives of this group, nystatin and rimocydin have been described in 1951. They are produced by *Streptomyces noursei* and *Streptomyces rimosus*, respectively, strains which produce terramycin.

Subsequently, antimycetin has been described as a product very similar to nystatin, produced by *Streptomyces aureus*, and chromin, obtained by growing a strain similar to *Streptomyces antibioticus*.

A tetraene chromophor is found also in the amphotericin A, obtained recently by growing Streptomyces M–4574.

Because of its morphological and culture characteristics, *Streptomyces lucensis* is a species clearly different from these above-named species. Moreover, the antibiotic produced by FI 1163 possesses chemical and physico-chemical properties which clearly differ from the aforementioned materials.

The fungicidal activity spectrum of FI 1163 in vitro is illustrated by Table I. Tests with Blastomycetes and Schizomycetes have been carried out on a meat broth to which glucose has been added, while tests with the true Hyphomycetes were carried out on a liquid Sabouraud medium.

Readings were taken after 8 days at 30° C.

TABLE 1

[Minimum inhibitory dose (MID) in mcg./ml.]

| | |
|---|---|
| (1) *Actinomyces boströmi* A | >100 |
| (2) *Nocardia asteroides* | >100 |
| (3) *Candida albicans* | 0.8 |
| (4) *Candida albicans val.* | 0.7 |
| (5) *Debaryomyces hudeloi* | 0.7 |
| (6) *Debaryomyces neoformans* | 0.6 |
| (7) *Debaryomyces tyrocola* | 8 |
| (8) *Debaryomyces marylandii* | 2 |
| (9) *Debaryomyces guillermondii* | 3 |
| (10) *Debaryomyces canensis* | 0.5 |
| (11) *Torulopsis neoformans* | 0.3 |
| (12) *Saccharomyces cerevisiae* | 2 |
| (13) *Eremothecium hashbyii* | 25 |
| (14) *Penicillium sp.* | 20 |
| (15) *Aspergillus sp.* (T) | 10 |
| (16) *Aspergillus niger* | 20 |
| (17) *Glenospora graphii* | 100 |
| (18) *Glenosporella dermatitidis* | <10 |
| (19) *Pseudomycoderma matalense* | 1 |
| (20) *Trichophyton faviforme ochraceum* | 30 |
| (21) *Trichophyton maggini* | 30 |
| (22) *Trichophyton radians* | 30 |
| (23) *Trichophyton rhodainii* | 30 |
| (24) *Trichophyton plicatile* | <10 |
| (25) *Trichophyton mentagrophytes* | 30 |
| (26) *Epidermophyton floccosum* | <10 |
| (27) *Sabouraudites gypseus* | <10 |
| (28) *Histoplasma capsulatum* (mycelium phase) | <10 |

Inoculation: about 1000 cells in case of Blastomycetes and Schizomycetes; fragments of young culture in case of true Hyphomycetes. It was found that the presence of 10% serum in the culture medium causes only slight modifications of the MID value.

Toxicity: The acute toxicologic aspect of FI 1163 is favorable since the LD 50, determined on rats by various administration methods, is far in excess of any therapeutical dose.

The following examples are presented to illustrate the present invention, but in no way to limit the scope thereof.

*Example 1*

Forty 300 cc. Erlenmeyer flasks are prepared, each containing 60 cc. of a medium having the following composition (in parts per thousand): sugar (dextrine) 20, corn steep liquor extract 10, casein 5, calcium carbonate 4, ammonium sulfate 1, potassium diphosphate 0.1 (pH of the medium: 6.7). These flasks, sterilized at 120° C. for 20 minutes, are inoculated each with 0.2 cc. of a suspension of spores obtained by washing a 20-days old culture with 10 cc. of sterile distilled water into a lip tube having a diameter of 25 mm.

The flasks are kept at 20° C. for 60 hours and agitated at an alternated rotative movement, at 220 revolutions per minute.

As may be seen from the following data, the activity reaches maximum value after approximately 40 hours:

| Fermentation time—hours | pH of the culture broth | Diameter of the inhibition halo on *Debar. maryl.* (agar plate method), mm. |
|---|---|---|
| 38 | 6.4 | 33 |
| 41 | 6.6 | 34.5 |
| 47 | 7.8 | 31.5 |
| 54 | 7.8 | 30.25 |
| 61 | 7.0 | 28 |

Example 2

3000 cc. of a medium are prepared, having the following composition:

| | Percent |
|---|---|
| Dextrin | 20 |
| Corn steep liquor extract | 3 |
| $CaCO_3$ | 4 |
| $(NH_4)_2SO_4$ (technical) | 1 |
| Casein | 5 |
| $K_2HPO_4$ | 0.1 |
| Water | balance |

After sterilization for 60 minutes at 120° C. (pH 7.10 after sterilization) in a 5 liter laboratory fermentation vessel and cooling, the vessel is inoculated with a suspension of spores.

The fermentation conditions are as follows:

Agitation _____ 400 r.p.m.
Aeration _____ 1 liter of air per liter per min.
Temperature _____ 27° C.
Time _____ 24 hours.

For the production stage, 10 liter fermentation vessels are used containing 6000 cc. of a medium having the following composition:

| | Percent |
|---|---|
| Saccharose | 20 |
| Dextrose | 10 |
| Dextrine | 10 |
| Corn steep liquor extract | 10 |
| $CaCO_3$ | 4 |
| $K_2HPO_4$ | 0.1 |
| $(NH_4)_2SO_4$ (technical) | 1 |
| Silicone (liquid) | 1 |

Sterilization of the medium is carried out at 120° C. for 90 minutes. Saccharose and dextrose are sterilized separately at 120° C. for 20 minutes. After sterilization the pH is 7.04. The medium is inoculated with 2.5% of a 24-hour old vegetable mycelium.

The fermentation conditions are as follows:

Agitation _____ 450 r.p.m.
Aeration _____ 1 liter of air per liter per min.
Temperature _____ 27° C.

Fermentation course:

| Age | pH | Content, mcg./ml. |
|---|---|---|
| D8 | 7.0 | |
| 24 | 6.6 | 200 |
| 48 | 7.0 | 580 |
| 55 | 7.0 | 1,020 |

Example 3

The fermentation is carried out as in the preceding example while substituting a medium having the same composition as that of the vegetative stage (Example 1) for the medium of the production stage.

Maximum content: 280 mcg./ml. after 48 hours.

Example 4

The fermentation is carried out as in Examples 2 and 3 while using a medium having the following composition instead of the medium of the production stage:

| | Percent |
|---|---|
| Sacchrose | 20 |
| Dextrose | 10 |
| NaCl | 3 |
| $(NH_4)_2SO_4$ (technical) | 20 |
| $CaCO_3$ | 10 |
| Silicone (liquid) | 1 |

Maximum content: 230 mcg./ml. after 24 hours.

Example 5

The fermenation is carried out as in Examples 2, 3 and 4 while using a medium having the following composition instead of that of the production stage:

| | Percent |
|---|---|
| Dextrose | 20 |
| NaCl | 3 |
| Corn steep liquor extract | 20 |
| $(NH_4)_2SO_4$ (technical) | 3 |
| $CaCO_3$ | 10 |
| Silicone (liquid) | 1 |

Maximum content: 170 mcg./ml. after 24 hours.

Example 6

18 liters of a fermented broth obtained as in Example 2 are filtered with supercel as filtration aid. The separated mycelium is extracted while agitating with 3 consecutive portions of n-butyl alcohol, measuring 2 liters, 5 liters and 5 liters, respectively. The filtered broth (17.1 liters) is extracted with 3 portions of butanol (total: 6.6 liters). All the extracts are combined, washed with water (2 liters) and vacuum evaporated at a temperature below 40° C. From the concentrate, the antibiotic is precipitated by adding petroleum-ether. Yield 16.6 g.

Example 7

128 g. of the crude antibiotic, obtained according to a process similar to that of Example 6, are dissolved in 1250 cc. of a saturated sodium bicarbonate solution.

This operation is carried out while passing a nitrogen stream through the liquid.

After diluting with an equal volume of water, the suspension is centrifuged and the resulting clear, brown solution adjusted to a pH of 4.5 by adding 6 N hydrochloric acid.

The antibiotic which precipitates as the free acid, is separated, by centrifugation, and dried. Yield: 95 g.

It is to be understood that changes in the foregoing examples obvious to those skilled in the art do not fall outside the scope of this invention.

We claim:
1. The process of producing the antibiotic FI 1163, which comprises incubating and aerating submerged in a liquid medium containing sources of assimilable carbon, nitrogen and mineral salts and having an initial pH of about 7, a culture of *Streptomyces lucensis* at a temperature ranging from about 20 to 37° C. for a period ranging from one to six days, extracting with a solvent taken from the group consisting of water immiscible alcohols, partly water miscible alcohols, chloroform, and aqueous acetone, concentrating in vacuo at a temperature ranging from room temperature to 40° C., treating the concentrate with a solvent taken from the group consisting of petroleum ether, ether and gasoline, separating and dissolving the resulting precipitate in a saturated sodium bi- carbonate solution while passing a stream of nitrogen through the solution and operating in the dark, diluting with about an equal amount of water, separating solids, adjusting the pH to between 3 and 6, and separating and drying the precipitated antibiotic.

2. The process of producing the antibiotic FI 1163, which comprises incubating and aerating submerged in a liquid medium containing sources of assimilable carbon, nitrogen and mineral salts and having an initial pH of about 7, a culture of *Streptomyces lucensis* at a temperature of about 20° to 37° C. for a period ranging from one to six days, extracting with n-butanol, concentrating in vacuo at a temperature ranging from room temperature to 40° C., treating the concentrate with petroleum ether, separating and dissolving the resulting precipitate in a phosphate buffer solution of pH 7.0 while passing a stream of nitrogen through the solution and operating in the dark, diluting, separating solids, adjusting the pH to about 4 to 5 with mineral acid, and separating and drying the precipitated antibiotic.

3. The process of producing the antibiotic FI 1163, which comprises incubating and aerating submerged in a liquid medium containing sources of assimilable carbon, nitrogen and mineral salts and having an initial pH of about 7, a culture of *Streptomyces lucensis* at a temperature of about 20° to 37° C., separating the mycelium from the clear broth, extracting the mycelium with n-butanol, extracting the broth with n-butanol, combining the extracts, washing with water, concentrating in vacuo at a temperature ranging from room temperature to 40° C., treating the concentrate with petroleum ether, separating and dissolving the resulting precipitate in a cool, saturated sodium bicarbonate solution while passing a stream of nitrogen through the solution and operating in the dark, diluting with about an equal amount of water, separating solids, adjusting the pH to about 4 to 5, and separating and drying the precipitated antibiotic.

4. The process of producing the fungicidal antibiotic FI 1163, comprising incubating, with aeration, in a liquid medium containing sources of assimilable carbon, nitrogen and mineral salts, a culture of *Streptomyces lucensis*, extracting with a solvent taken from the group consisting of water immiscible alcohols, partly water miscible alcohols, chloroform and aqueous acetone, concentrating in vacuo at a temperature ranging from room temperature to 40° C., treating the concentrate with a solvent taken from the group consisting of petroleum ether, ether and gasoline, separating and dissolving the resulting precipitate in a saturated sodium bicarbonate solution while passing a stream of nitrogen through the solution and operating in the dark, diluting with about an equal amount of water, separating solids, adjusting the pH to between 3 and 6, and separating and drying the precipitated antibiotic, which is a nitrogen containing, sulfur-free, acidic polyene antibiotic with a tetraene chromophor, having an ultraviolet absorption spectrum with maxima at 290, 304 and 318 mμ, being substantially insoluble in water, ether and gasoline but readily soluble in pyridine, dimethyl formamide, lower aliphatic alcohols, chloroform and aqueous mixtures of said alcohols and acetone, and forming water-soluble salts with alkali metals.

5. The process of producing the fungicidal antibiotic FI 1163, comprising incubating, with aeration, in a liquid medium containing sources of assimilable carbon, nitrogen and mineral salts, a culture of *Streptomyces lucensis*, extracting with a solvent taken from the group consisting of water immiscible alcohols, partly water miscible alcohols, chloroform and aqueous acetone, concentrating in vacuo at a temperature ranging from room temperature to 40° C., treating the concentrate with a solvent taken from the group consisting of petroleum ether, ether and gasoline, separating and dissolving the resulting precipitate in a phosphate buffer solution of about pH 7.0, separating solids, adjusting to a pH of about 4 to 5 to precipitate the said antibiotic, which is a nitrogen containing, sulfur-free, acidic polyene antibiotic with a tetraene chromophor, having an ultraviolet absorption spectrum with maxima at 290, 304 and 318 mμ, being substantially insoluble in water, ether and gasoline but readily soluble in pyridine, dimethyl formamide, lower aliphatic alcohols, chloroform and aqueous mixtures of said alcohols and acetone, and forming water-soluble salts with alkali metals.

6. The antibiotic, FI 1163, produced by the process of claim 1, being a nitrogen containing, sulfur-free, acidic polyene antibiotic with a tetraene chromophor, having an ultraviolet absorption spectrum with maxima at 290, 304 and 318 mμ, being substantially insoluble in water, ether and gasoline but readily soluble in pyridine, dimethyl formamide, lower aliphatic alcohols, chloroform and aqueous mixtures of said alcohols and acetone, and forming water-soluble salts with alkali metals.

7. A process for producing a product containing the antibiotic FI 1163, comprising incubating and aerating submerged in a liquid medium containing sources of assimilable carbon, nitrogen, and mineral salts, a culture of *Streptomyces lucensis*, and extracting with a solvent for said antibiotic, said antibiotic FI 1163 being a nitrogen containing, sulfur-free, acidic polyene antibiotic with a tetraene chromophor, having an ultraviolet absorption spectrum with maxima at 290, 304 and 318 mμ, being substantially insoluble in water, ether and gasoline but readily soluble in pyridine, dimethyl formamide, lower aliphatic alcohols, chloroform and aqueous mixtures of said alcohols and acetone, and forming water-soluble salts with alkali metals.

References Cited in the file of this patent

Pridham et al.: Applied Microbiology, January 1958, pages 52–79.

Sneath: J. Gen. Microbiology, August 1957, pages 185–200.

Ball et al.: J. Gen. Microbiology, August 1957, pages 96–102.

Vanek et al.: J. Gen. Microbiology, June 1958, pages 649–657.

Pledger et al.: Antibiotics Annual 1955–1956, pub. 1956, pages 249–253.

Thom et al.: Proceeding of the N.Y. Academy of Sciences, 1948, pages 5 and 24.

Erickson: Annual Review of Microbiology, vol. 3, 1949, page 50.

Thom et al.: Annals of the N.Y. Academy of Sciences, October 29, 1954, pp. 5 and 24.

Erickson: Annual Review of Microbiology, vol. 3, 1949, page 50.